United States Patent [19]

Savolainen et al.

[11] Patent Number: 5,233,608
[45] Date of Patent: Aug. 3, 1993

[54] METHOD OF AND A DEVICE FOR RECEIVING DATA PACKET FORM

[75] Inventors: Juha Savolainen, Hankasalmi; Rauno Stylman; Jukka Lamminmäki, both of Äänekoski, all of Finland

[73] Assignee: Computec OY, Helsinki, Finland

[21] Appl. No.: 741,046

[22] Filed: Aug. 6, 1991

[30] Foreign Application Priority Data

Aug. 15, 1990 [FI] Finland ............................... 904042

[51] Int. Cl.$^5$ ............................................. H04L 7/04
[52] U.S. Cl. .............................. 370/94.1; 370/105.3; 375/108
[58] Field of Search ............... 375/108, 111; 370/94.1, 370/105.3, 100.1

[56] References Cited

U.S. PATENT DOCUMENTS

| | | | |
|---|---|---|---|
| 4,596,025 | 6/1986 | Satoh | 370/94.1 |
| 4,849,993 | 7/1989 | Johnson et al. | 375/108 |
| 5,050,193 | 9/1991 | Ponsard | 375/108 |

FOREIGN PATENT DOCUMENTS

| | | |
|---|---|---|
| 0333196 | 9/1989 | European Pat. Off. |
| 61-216541 | 9/1986 | Japan . |
| 62-242435 | 10/1987 | Japan . |
| 1309540 | 12/1989 | Japan . |

OTHER PUBLICATIONS

IBM Technical Disclosure Bulletin, "External Clock Failure Detection in Communication Networks", vol. 26, No. No. 10B, Mar. 1984, p. 5686.

*Primary Examiner*—Benedict V. Safourek
*Attorney, Agent, or Firm*—Cushman, Darby & Cushman

[57] ABSTRACT

A method of and a device for receiving data in packet form. In the method, a synchronization with incoming data is searched for by using a receiving modem, and first clock pulses in correct synchronization with the data are generated and the synchronized clock pulses are supplied to a receiver circuit system to ascertain the synchronization and to start receiving. To reduce repetitions necessary due to a data break after the reception of data has started, second clock pulses generated by an outer circuit are synchronized substantially to the same frequency and the same phase as the first synchronized clock pulses and the clock pulses to be supplied to the receiver circuit system are replaced for the time of the latter part of the data packet by the second clock pulses generated by the outer circuit.

4 Claims, 1 Drawing Sheet

METHOD OF AND A DEVICE FOR RECEIVING DATA PACKET FORM

BACKGROUND OF THE INVENTION

The invention relates to a method of and a device for receiving data in packet form. In the method, a synchronization with incoming data is searched for by means of a receiving modem and clock pulses in correct synchronization with the data are generated and the synchronized clock pulses are supplied to a receiver circuit system to ascertain the synchronization and to start receiving. The device according to the invention comprises a modem for searching for a synchronization with incoming data and for generating clock pulses in correct synchronization with the data and a receiver circuit system connected to the modem to ascertain the synchronization and to start receiving.

The solution provided by the invention is especially suitable for radiotelephone systems, but it can also be applied to cable systems.

If there occurs a break in the data flow to be received during a data packet, the receiving modem begins to search for a new synchronization point at once, due to which it may be synchronized with noise, for instance, or with some other wrong point after the break. That is why the synchronization is often lost during a data break in present receiving systems, which leads to the eventuality that the receiving devices have to request for a retransmission of the whole data packet. Such a break can occur, e.g., due to a fading radio signal.

SUMMARY OF THE INVENTION

The object of the present invention is thus to get rid of the problem described above, and to provide a new type of a method of and a device for receiving data in packet form, by means of which method and device unnecessary repetitions of this kind can be avoided. By means of the method of the invention, this can be achieved in such a way that, after the data reception has started, outer clock pulses generated by an outer circuit are synchronized substantially to the same frequency and the same phase as the synchronized clock pulses and the clock pulses to be supplied to the receiver circuit system are, for the time of the latter part of the data packet, replaced by the clock pulses generated by the outer circuit.

The basic idea of the invention is to replace the clock pulses generated by the modem after the synchronization achieved at the beginning of a data packet by another train of clock pulses which are independent of the modem and are with a sufficient accuracy synchronized to the frequency and the phase of the clock pulses generated by the modem, and to synchronize the reception by means of this other train of clock pulses until the end of the packet.

Because of to the solution provided by the present invention, the synchronization achieved at the beginning of the data packet can be preserved at the data reception during the whole incoming packet, even if the data flow broke during transmission of the packet due to some interference, such as a fading radio signal, for instance. In such a way, the efficiency of the data transmission can be made better, because a great part of the repetitions required earlier can be avoided.

BRIEF DESCRIPTION OF THE DRAWINGS

In the following, the invention is described more completely with reference to the examples which are shown in the attached drawing, in which.

DETAILED DESCRIPTION

Figures 1, 2:
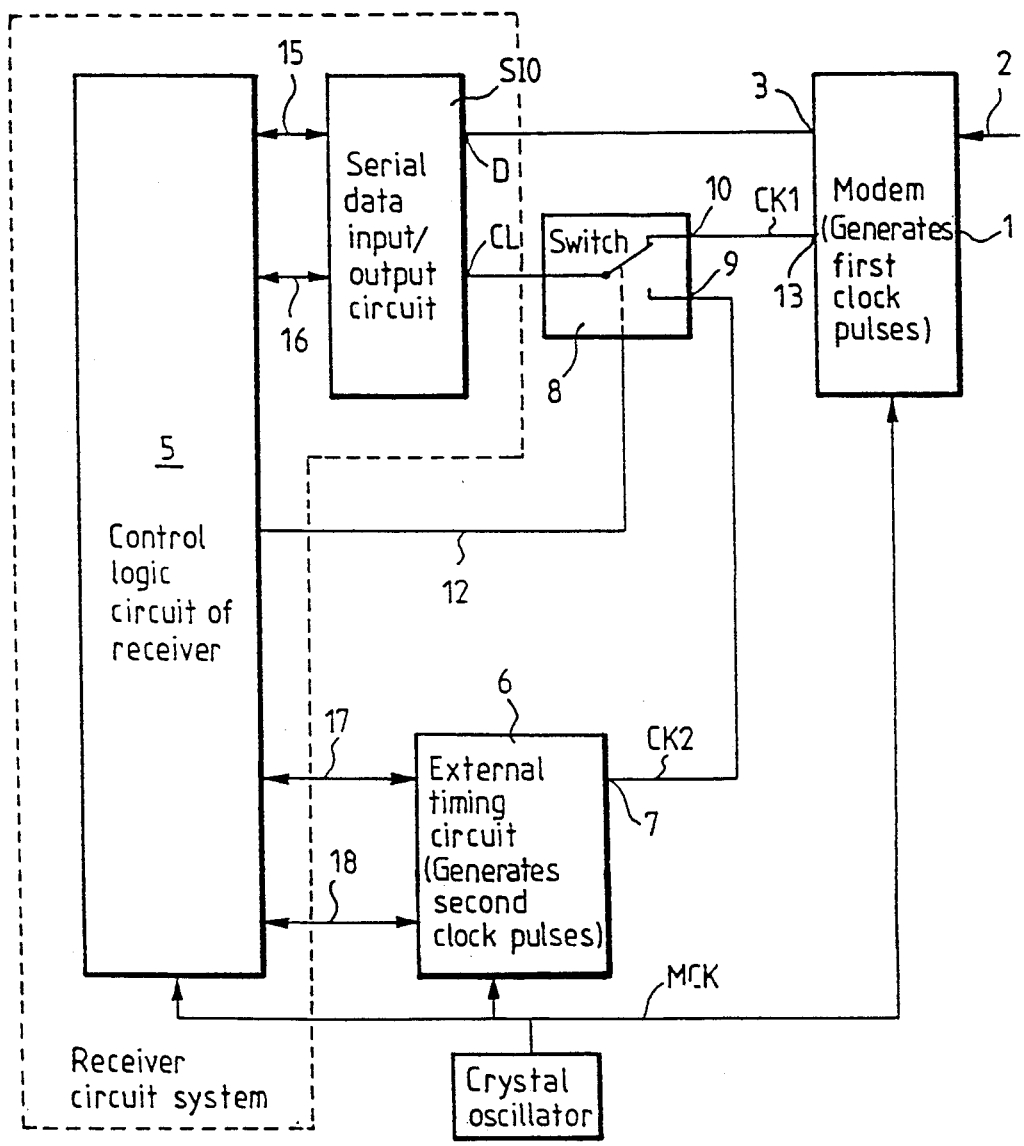
FIG. 1 shows a typical structure of a data packet to be received.
FIG. 2 shows a block diagram of receiver devices according to the invention.

FIG. 1 shows a typical structure of a data packet DP to be received by means of devices according to the invention. The packet comprises a frame header FH to be used for generating a synchronization and including, e.g., an identifier of a base station, a primary block PB including, e.g., the address of a mobile station and an information of the length of the whole data packet, and n successive data blocks DB, the number of which depends on the amount of the data to be transmitted.

The receiving devices according to the invention shown in FIG. 2 primarily comprise a modem 1 receiving incoming data 2 being in packet form and having a frame structure of the same type as the data packet DP shown, for instance, in FIG. 1. As to the modulation method, the data to be received can be, for instance a FFSK (Fast Frequency Shift Keying) -modulated signal generally used in radiotelephone systems.

A data output 3 of the modem 1 is connected to a data terminal D of a serial data input/output circuit SIO, and the input/output circuit again is connected to a control logic circuit 5 of the receiver in a manner known per se. In FIG. 2, the connection between the input/output circuit and the control logic circuit is indicated by two bidirectional busses 15 and 16. There is a common term for the input/output circuit and the control logic circuit, viz. receiver circuit system.

According to the invention, the devices comprise an outer timing circuit 6 controlled by means of the control logic circuit 5 through bidirectional busses 17 and 18; a clock output 7 of the timing circuit being connected to a terminal 9 of a switch 8. To the other terminal 10 of the switch 8 is connected a clock output 13 of the modem 1. In its rest position, the switch 8 is in the position according to FIG. 1, in which the clock output 13 of the modem is connected to a clock input CL of the input/output circuit SIO.

When the reception starts, the modem 1 is automatically synchronized with the incoming data, clock pulses CKI generated thereby being in exactly correct synchronization with the incoming data. The clock pulses CKI are through the switch 8 connected to the clock input CL of the input/output circuit SIO, due to which the control logic circuit 5 ascertains that a synchronization (bit synchron) has been achieved and the input/output circuit SIO can start receiving data. All the phases described above are known per se, and therefore, they are not explained more closely in this connection.

After the input/output circuit SIO has started receiving data, clock pulses CK2 generated by the outer timing circuit 6 are synchronized by means of the control logic circuit 5 with a sufficient accuracy to the same frequency and the same phase as the clock pulses Ck1 generated by the modem 1. After this, the clock pulses received by the input/output circuit SIO are switched by the switch 8 to come from the outer timing circuit 6. The switch is controlled by means of the control logic circuit 5 through a control bus 12 connected to the switch. In this example, master clock pulses MCK controlling the timing circuit 6 and the rest of the system come from the same source, e.g. from a crystal oscillator 14, and they have the accuracy of frequency required by the system, due to which the receiving devices remain synchronized, even if a one block long or several blocks long break occurred in the data flow. When "correct" data is received from the modem after such a break, it is immediately read in correctly, and so, unnecessary requests for repetition need not be transmitted. The reception is synchronized by means of the clock pulses CK2 generated by the timing circuit 6 until the end of the data packet (information of the length of the packet was received from the primary block PB). When the data packet has run out, the switch 8 is returned back to the rest position according to FIG. 2, and then the clock pulses for the input/output circuit SIO are again received from the modem 1. After this, the devices wait for a synchronization with the following data packet, at the arrival of which the steps described above are repeated.

By means of the solution provided according to the invention, it is possible to achieve that a request for a repetition needs to be made only concerning the blocks which found to be damaged (the blocks arrived during a break), while earlier, in consequence of lost synchronization, a retransmission of all blocks after the break had to be requested for.

All the separate blocks of the device shown in FIG. 2 are circuits known per se, and so no connections therein have been described herein in greater detail. The following types of circuit are mentioned as examples of practical circuits, which can be used in the connection described above:

- modem 1: CML-FX 419
- input/output circuit SIO: Z 80 SIO 84C40
- control logic circuit 5: CPU Z80 with its interface components,
- switch 8: CMOS-CD 4066, and
- timing circuit 6: Intel 82C54.

Although the invention has been described above referring to the example shown in the attached drawing, it is clear that the invention is not restricted thereto, but it can be varied in many ways within the scope of the inventive idea described above and in the following claims. For example, one skilled in the art is able to change the details of the structure of each separate block of the device shown in FIG. 2, without deviating from the basic solution described above.

We claim:

1. A method of receiving data in packet form, comprising the steps of:

(a) searching for synchronization with incoming data, (b) generating first clock pulses in correct synchronization with the incoming data, said first clock pulses having a given frequency, (c) supplying said synchronized first clock pulses to a receiver circuit system which includes a data input/output circuit operatively connected by data and control buses to a receiver control logic circuit, for reception of a first part of a packet, (d) starting reception of data by means of the receiver circuit system, (e) synchronizing second clock pulses generated by an external circuit substantially to the same given frequency as and in phase with said synchronized first clock pulses, and (f) supplying said synchronized second clock pulses thereto to the receiver system in substitution for supplying said synchronized first clock pulses for reception of a latter part of said packet contiguous to said first part to thereby preserve synchronization during reception of the whole of said packet by said receiver circuit system.

2. The method of claim 1, further including:

(g) providing a master clock signal;

steps (a) and (b) being conducted by a modem; and steps (b) and (e) comprising using said master clock signal to control generation of first and second clock pulses respectively by said modem and said receiver circuit system.

3. A device for receiving data in packet form, the device comprising:

means for searching for synchronization with incoming data, means for generating first clock pulses in correct synchronization with the incoming data, said first clock pulses having a given frequency, a receiver circuit system comprising a data terminal to which the incoming data are connected, and a clock input terminal connected to said means for generating said synchronized first clock pulses, for supplying said synchronized first clock pulses to said receiver circuit system for reception of a first part of a packet, means for generating second clock pulses and for synchronizing said second clock pulses substantially to have the same given frequency as and to be in phase with said synchronized first clock pulses, and means supplying said synchronized second clock pulses to said receiver circuit system in substitution for supplying said synchronized first clock pulses thereto for reception of a latter part of said packet contiguous to said first part to thereby preserve synchronization during reception of the whole of said packet by said receiver circuit system.

4. A device according to claim 3, wherein said supplying means comprise a logic switch controlled by said receiver circuit system.

* * * * *